United States Patent
Roberts et al.

(10) Patent No.: US 7,046,700 B1
(45) Date of Patent: May 16, 2006

(54) SPECTRALLY INVISIBLE FRAMING OF HIGH ERROR RATE DATA SIGNALS

(75) Inventors: Kim B. Roberts, Nepean (CA); Wolfgang W. Oberhammer, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 1048 days.

(21) Appl. No.: 09/800,523

(22) Filed: Mar. 8, 2001

(51) Int. Cl.
*H04J 3/04* (2006.01)
*H04J 3/06* (2006.01)
*H04J 3/16* (2006.01)

(52) U.S. Cl. ............ 370/535; 370/535; 370/512; 370/470

(58) Field of Classification Search ........... 370/535, 370/514, 350, 509, 510, 511, 512, 513, 470, 370/477, 503; 375/354, 358, 364, 365, 366, 375/368
See application file for complete search history.

(56) References Cited

U.S. PATENT DOCUMENTS

| | | | | |
|---|---|---|---|---|
| 4,759,018 A | * | 7/1988 | Buchner | 370/535 |
| 5,526,297 A | * | 6/1996 | Snyder et al. | 708/212 |
| 5,619,507 A | * | 4/1997 | Tsuda | 370/514 |
| 6,069,928 A | * | 5/2000 | Gupta | 375/366 |
| 6,219,357 B1 | * | 4/2001 | Ishikawa | 370/535 |
| 6,331,989 B1 | * | 12/2001 | Tezuka | 370/535 |
| 6,771,671 B1 | * | 8/2004 | Fields et al. | 370/514 |

* cited by examiner

*Primary Examiner*—Hanh Nguyen
(74) *Attorney, Agent, or Firm*—Kent Daniels; Ogilvy Renault LLP

(57) ABSTRACT

A framer is adapted for framing a high error rate data signal received through a link of a communications network, the data signal comprising M (an integer, M>1) interleaved sub-streams. The framer includes means for detecting a respective unique synchronizing word within each sub-stream. Each respective unique synchronizing word comprises: a non-unique position word having a first predetermined hamming distance; and a non-unique identifier word having a second predetermined hamming distance. The framer preferably includes M individual framers, and a master framer. Each individual framer operates to search the data signal to detect a respective one of the respective unique synchronizing words; and assert a respective individual frame found state for a first predetermined period of time when a respective one of the unique synchronizing words is found. The master framer controls operations of each individual framer, and declares a master frame lock state if the individual frame found state is asserted by all of the individual framers within a second predetermined period of time.

45 Claims, 5 Drawing Sheets

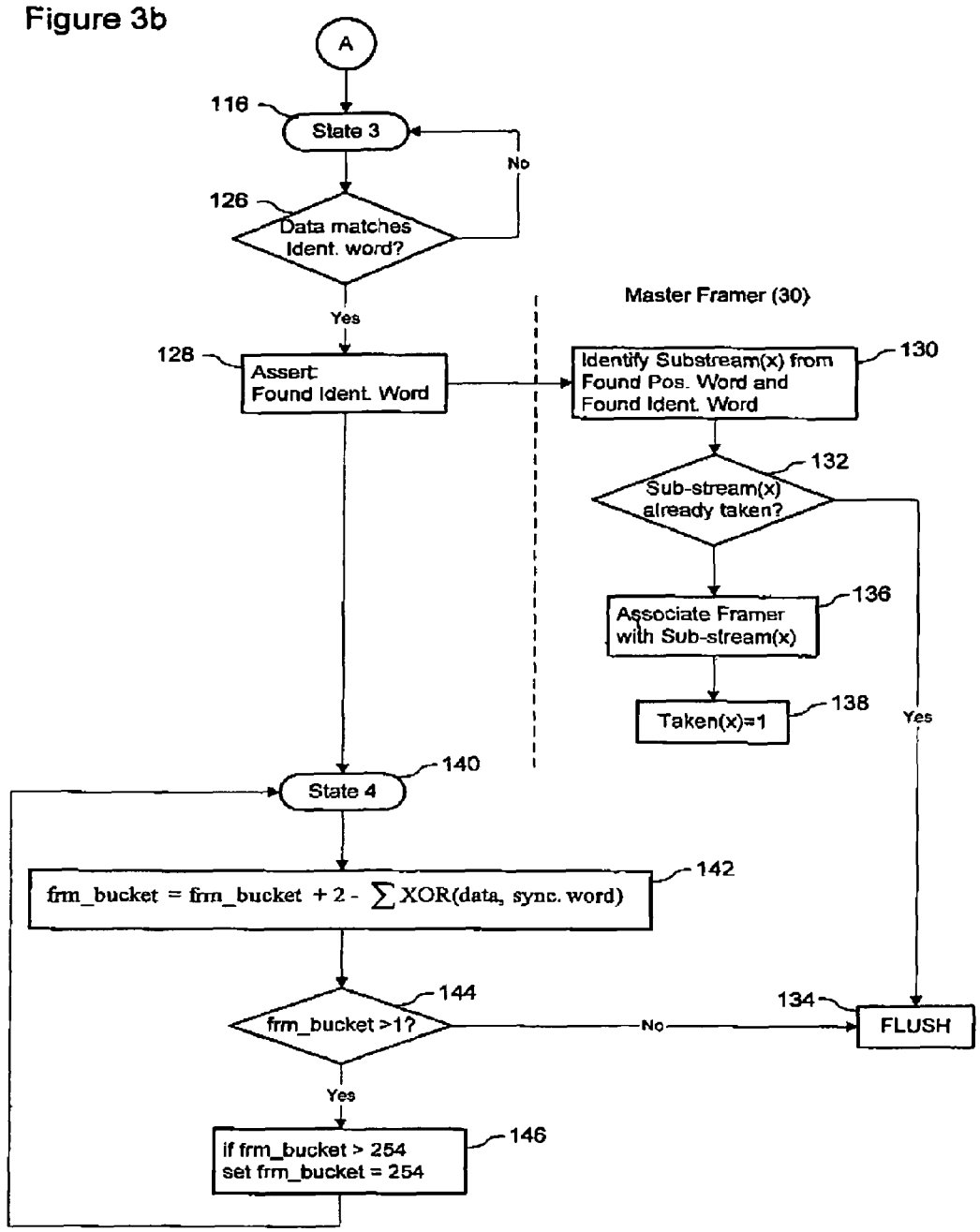

SPECTRALLY INVISIBLE FRAMING OF HIGH ERROR RATE DATA SIGNALS

CROSS-REFERENCE TO RELATED APPLICATIONS

This is the first application filed for the present invention.

MICROFICHE APPENDIX

Not Applicable.

TECHNICAL FIELD

The present invention relates to high error rate data communications, and in particular to a method and system for spectrally invisible framing of high error rate data signals.

BACKGROUND OF THE INVENTION

In the modern communications network space, signal reach and spectral density are important factors in overall network cost. Assuming other factors to be equal, increases in either signal reach or spectral density tend to reduce overall network cost and are thus very attractive to network service providers.

Signal reach is the distance that an optical signal can be transmitted through a fiber, before conversion to electronic form is required to perform signal regeneration. Using suitable optical amplifiers and optical processing techniques, between 10 and 20 fiber spans (of 40–80 km each) can be traversed by an optical signal before optical/electrical conversion and regeneration are required.

Spectral density, which is normally expressed in terms of bits/sec/Hz (b/s/Hz), is a measure of the extent to which the theoretical maximum bandwidth capacity of an optical channel is utilized. This value is generally determined by dividing the line rate (in bits/sec.) of a channel by the optical frequency (in Hz) of that channel. A spectral density of 1 indicates that, for a given channel, the line rate and optical frequency are equal. Existing telecommunications systems commonly operate at line rates of approximately 2.5 Gb/s to 40 Gb/s. At a line rate of 10 Gb/s, current Wavelength Division Multiplexed (WDM) (or Dense Wave Division Multiplexed (DWDM)) transmission systems achieve a spectral density of approximately 0.1 b/s/Hz. If the line rate is increased to 40 Gb/s, the spectral density increases to approximately 0.4 b/s/Hz, illustrating the advantages of increasing the line rate.

However, increasing the line rate raises a number of difficulties. In particular, at line rates of about 10 Gb/s and higher, the optical characteristics of a fiber link have an increasingly important effect on the signal-to-noise ratio at the receiving end of the link, which manifests itself as an increased bit error rate of the regenerated signal. In addition, the physical limitations of electronic circuits at each end of the link mean that signal processing becomes progressively less reliable as the line rate increases. Both of these difficulties become of particular importance at line rates of 40 Gb/s, and present significant obstacles to further increases in line rate beyond this speed.

One known method of addressing the problem of increased bit error rates at higher line rates is to encode the data signal using a known Forward Error Correction encoding scheme (e.g. BCH) prior to transmitting the signal through the link. The FEC-encoded signal can be decoded at the receiving end of the link, to recover the original data signal. FEC encoding enables errored bits within the recovered data signal to be corrected at the receiving end of the link, and thereby enables effective data transport in spite of the increased bit error rates encountered at high line rates.

Difficulties resulting from the physical limitations of electronic circuits can be addressed by dividing the signal into a plurality of parallel sub-streams, which can be parallel processed at a lower line rate (e.g. 2.5 Gb/s). The sub-streams can be independently FEC encoded, and interleaved (e.g. using a conventional sequential interleaving process) into a single high-speed signal having a line rate exceeding that which can be accommodated with conventional electronic signal processing hardware. However, the success of this approach is entirely dependent on the ability of the node at the receiving end of the link to successfully separate the signal to recover each of the sub-streams at the receiving end of the link. This, in turn, requires a framer capable of correctly identifying each frame of each sub-stream within the high-speed signal, which is at least partially dependent on the bit error rate of the high-speed signal. For example, within the Synchronous Optical Network (SONET) protocol, a framer can typically tolerate a bit error rate of less than about 0.01 without declaring a loss-of-frame condition.

However, as mentioned previously, the bit error rate of a received signal tends to increase with higher line rates. The need to keep bit error rates lower than about 0.01 imposes a significant limitation, which frequently requires a designer to trade off signal reach in order to attain higher line rate (spectral density).

One way of improving the operation of framer is to insert a predetermined unique synchronization word into each sub-stream prior to interleaving the sub-streams into the signal. The framer can then identify each of the sub-streams by searching the signal to detect each of the unique synchronization words. However, this arrangement suffers limitations in that correct detection of the unique synchronization word is affected by the bit error rate, and thus degrades as the bit error rate increases. Additionally, because the unique synchronization word is inserted into each sub-stream at regular periods (typically at each frame), the energy spectrum of the signal becomes characterized by a recurring bit pattern having a fixed frequency. This is detected within both optical and electronic signal processing devices as an harmonic signal component, which tends to degrade the efficiency of these signal processing devices.

Accordingly, a method and apparatus for reliably framing high bit error rate signals composed of multiple interleaved sub-streams, while maximizing the efficiency of signal processing equipment, remains highly desirable.

SUMMARY OF THE INVENTION

An object of the present invention is to provide a method and apparatus for reliably framing a high bit error rate data signal composed of multiple interleaved sub-streams.

Another object of the present invention is to provide a method and apparatus for reliably framing a data signal using a spectrally invisible synchronization word.

Accordingly, an aspect of the present invention provides a method of framing a data signal received through a link of a communications network, the data signal comprising M (an integer, M>1) interleaved sub-streams. In accordance with the method of the invention, the data signal is inverse multiplexed to generate M recovered sub-streams. The recovered sub-streams are then processed, in parallel, to detect a respective unique synchronizing word in each of the recovered sub-streams within a predetermined search window.

Another aspect of the present invention provides a synchronizing word adapted for uniquely identifying a respective one of M (an integer, M>1) sub-streams interleaved within a data signal. The synchronizing word includes a non-unique position word and a non-unique identifier word. The position word has a significant hamming distance relative to a shifted version of itself. The identifier word is selected from a set of predetermined identifier words, and has a significant hamming distance relative to each of the other identifier words in the set.

A further aspect of the invention provides a framer adapted for framing a high error rate data signal received through a link of a communications network, the data signal comprising M (an integer, M>1) interleaved sub-streams, the framer comprising means for detecting a respective unique synchronizing word in each one of M recovered sub-streams extracted from the data signal, within a predetermined search window.

Another aspect of the invention provides a method of transporting a data signal comprising a plurality of interleaved sub-streams through a link of a communications network, each sub-stream being uniquely identified by a respective synchronization word inserted into the respective sub-stream prior to interleaving the sub-streams into the data signal, wherein a bit pattern of each synchronizing word is selected such that an energy spectrum of the synchronization words interleaved within the data signal is substantially white.

The width of the predetermined search window may be determined using an expected delay between corresponding data units of a first interleaved sub-stream and a last interleaved sub-stream of the data signal. In some embodiments, the search window corresponds to a portion of the data signal received during a period of up to twice an expected delay between corresponding data units of a first interleaved sub-stream and a last interleaved sub-stream of the data signal Detection of a unique synchronizing word within each sub-stream may be accomplished by independently searching each recovered sub-stream to detect a respective synchronizing word. When a synchronizing word is detected in a sub-stream, a respective individual frame found state is asserted for a first predetermined period of time. A master frame found state can then be asserted if the individual frame found state is asserted in respect of all of the sub-streams within the predetermined search window.

The first predetermined period of time may be determined using an expected delay between corresponding data units of a first interleaved sub-stream and a last interleaved sub-stream of the data signal.

In some embodiments, each recovered sub-stream is searched by buffering a portion of the recovered sub-stream. The buffered sub-stream data can then be compared against each one of a set of predetermined unique synchronizing words, to detect a respective one of the set of predetermined unique synchronizing words in the recovered sub-stream.

In some embodiments, each synchronizing word comprises a non-unique position word and a non-unique identifier word. In such cases, comparison of buffered sub-stream data against each one of a set of predetermined unique synchronizing words may be accomplished by comparing the buffered sub-stream data against each one of a set of predetermined valid position words to detect a position word in the recovered sub-stream. When a position word is detected in the recovered sub-stream, the buffered sub-stream data can be compared against each one of a set of predetermined valid identifier words to detect an identifier word in the recovered sub-stream.

In some embodiments, an individual frame found state may be asserted by de-asserting an individual Out-of-Frame flag associated with the respective recovered sub-stream. Information indicative of the synchronizing word detected in the respective recovered sub-stream may also be asserted. This information may be used identify a respective one of the interleaved sub-streams, and associating the identified interleaved sub-stream with the recovered sub-stream. In some embodiments, the search of the recovered sub-stream can be reinitialized if the identified interleaved sub-stream has previously been associated with another one of the recovered sub-streams.

In some embodiments, assertion of the master frame found state can be accomplished by monitoring a number of recovered sub-streams for which respective individual frame found states are simultaneously asserted, A location in the data signal at which individual frame found states are simultaneously asserted in respect of at least N (an integer 1<N<M) of the M recovered sub-streams can then be detected. The search window can then be asserted bracketing the detected location at which individual frame found states are simultaneously asserted in respect of at least N of the recovered sub-streams. Finally, the master frame found state is asserted if individual frame found states are asserted in respect of all of the recovered sub-streams within the asserted search window.

The value of N may be determined using an expected probability of an individual frame-found state being incorrectly asserted in respect of any one of the M recovered sub-streams. In some embodiments, N is 4.

It is possible that, following assertion of the predetermined search window, an individual frame-found state will not have been asserted in respect of at least one recovered sub-stream. In such cases, the search of the affected recovered sub-stream can be narrowed to the portion of the recovered sub-stream within the asserted search window. Framing of the data signal may be restarted if the master frame found state is not asserted within a second predetermined period of time. This second predetermined period of time may be defined as a predetermined number of frames following a first assertion of the search window. The number of frames may be determined using an expected probability of the frame-possible state being incorrectly asserted, and may, for example, be about ten.

In some embodiments, a bit pattern of the synchronizing word is selected such that an energy spectrum of respective synchronization words of each of the sub-streams interleaved within the data signal is substantially white.

In some embodiments, respective lengths of the position and identifier words are selected using one or more of: a probability of incorrectly detecting the synchronizing word in the data signal; and a mean time to correctly declare the master frame found state. The respective hamming distances of the position and identification words may be selected using an expected bit error rate (BER) of the data signal. The expected BER may be about 0.05, or less. For example, the position word may have a length of at least 16 bits, and at most 32 bits, and a hamming distance of about 10 relative to a shifted version of itself. The identification word may have a length of about 10 bits and a hamming distance of about 5 relative to the other identification words in the set.

BRIEF DESCRIPTION OF THE DRAWINGS

Further features and advantages of the present invention will become apparent from the following detailed description, taken in combination with the appended drawings, in which:

FIGS. 3a and 3b show a state diagram schematically illustrating state transitions of the IF state machine of each individual framer of FIG. 1.

It will be noted that throughout the appended drawings, like features are identified by like reference numerals.

DETAILED DESCRIPTION OF THE PREFERRED EMBODIMENT

Figure 1:
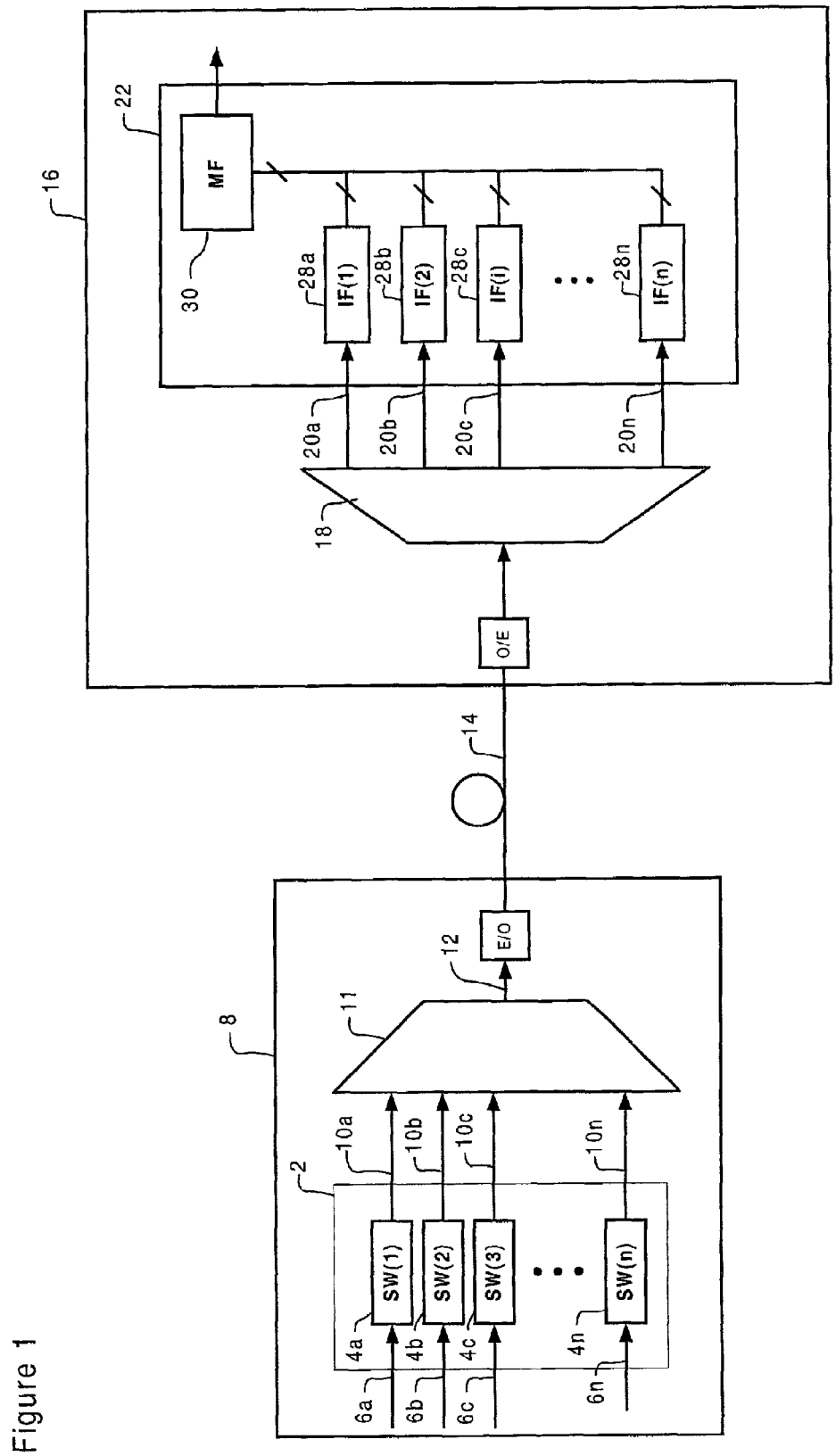
FIG. 1. is a block diagram schematically illustrating operation of a framer in accordance with an embodiment of the present invention.

The present invention provides a robust system for framing high error rate data signals composed of multiple interleaved sub-streams. FIG. 1 is a block diagram schematically illustrating principle elements in a system in accordance with the present invention. As shown in FIG. 1, the system comprises a sub-stream processor 2 which operates to insert a predetermined unique synchronization word 4 into each sub-stream 6 in a transmitting node 8 of a communications network. The processed sub-streams 10 are then multiplexed by a multiplexer 11 into a single high-speed data signal 12 prior to electrical/optical conversion for transmission through a link 14 of the communications network to a receiving node 16. At the receiving node 16, the high-speed data signal 12 is optical/electrical converted and de-multiplexed, by a demultiplexer 18 which operates to reverse the multiplexing operation of the multiplexer 11, and thereby generate recovered sub-streams 20 corresponding to respective ones of the processed sub-streams 10.

In the illustrated embodiment, the optical link 14 is illustrated as a single span between the transmitting and receiving nodes 8, 16. However, it will be appreciated that the optical link 14 may include multiple spans, and traverse one or more network devices (e.g. optical amplifiers) intermediate the transmitting and receiving nodes 8,16. The transmitting and receiving nodes 8,16 may be any network nodes in which optical signals are converted into electrical signals and regenerated for processing. Exemplary network nodes of this type include add-drop-multiplexers (ADMs), routers, and cross-connects.

In order to maximize both the line rate and signal reach within the optical fiber link 14, the signal to noise ratio of the data signal 12 received at the receiving node 16 will tend to be comparatively low. This low signal to noise ratio will be evidenced by a comparatively high bit error rate within the received data signal 12, and this bit error rate will also be reflected in each of the recovered sub-streams 20 extracted from the received data signal 12. It is anticipated that short-term bit error rates of 0.01, with bit error rates of as high as 0.05, may be encountered within each of the recovered sub-streams 20 during system start-up. Additionally, in practical implementations, it is impossible to guarantee that a sub-stream 10 output by the signal processor 2 through a given channel "A" will be output by the demultiplexer 18 through a corresponding channel "A". In general, the channel through which a recovered sub-stream 20 is output from the demultiplexer 18 at the receiving node 16 will be different from the channel through which the original sub-stream 10 was output by the signal processor 2 at the transmitting node 8. Thus, the present invention provides a robust framer 22 which is adapted to reliably achieve frame lock in respect of each of the recovered sub-streams 20 (even at high bit error rates), and which associates each output channel of the demultiplexer 18 with a respective one of the original processed sub-streams 10 in order to facilitate any necessary channel re-ordering downstream of the framer 22 (not shown). These objectives are accomplished by the functionality of the framer 22, in combination with the format of the synchronizing words 4 inserted into each sub-stream 6 prior to interleaving the processed sub-streams 10 into the data signal 12. An exemplary format of synchronization words 4 in accordance with the present invention is shown below in Table 1.

TABLE 1

| | Synchronization Word (4) | |
|---|---|---|
| Sub-Stream | Position Word (24) length = 22 bits Hamming Distance = 10 | Identifier Word (26) length = 10 bits Hamming Distance = 5 |
| 1 | 0000010000111010110111 | 0000000000 |
| 2 | 1111101111000101001000 | 0000011111 |
| 3 | 0000010000111010110111 | 0011100011 |
| 4 | 1111101111000101001000 | 0011111100 |
| 5 | 1111101111000101001000 | 1111011011 |
| 6 | 1111101111000101001000 | 1111000100 |
| 7 | 1111101111000101001000 | 1100111000 |
| 8 | 0000010000111010110111 | 1100100111 |
| 9 | 0000010000111010110111 | 1111000100 |
| 10 | 0000010000111010110111 | 1111011011 |
| 11 | 1111101111000101001000 | 1100100111 |
| 12 | 0000010000111010110111 | 0011111100 |
| 13 | 0000010000111010110111 | 0000011111 |
| 14 | 0000010000111010110111 | 1100111000 |
| 15 | 1111101111000101001000 | 0011100011 |
| 16 | 1111101111000101001000 | 0000000000 |

In the embodiment of Table 1, each synchronization word 4 is a 32-bit sequence composed of: a position word 24 used to indicate a frame phase (nominally the beginning of each frame) of a respective sub-stream 10; and an identifier word 26 used, in combination with the position word 24, to uniquely identify each sub-stream 10 within the data signal 12. In addition, the bit sequence of each synchronization word 4 (that is, the position word 24 and the identifier word 26 taken together) is selected such that the energy spectrum of the interleaved synchronization words 4 within the data signal 12 is substantially white. This renders the interleaved synchronization words 4 spectrally invisible to optical devices within the link 12, thereby enabling optimization of the link performance.

As shown in Table 1, the position word 24 and identifier word 26 each have a respective length and hamming distance. In each case, the respective length and hamming distance are selected to enable robust frame detection and bit error tolerance. In particular, the length of the position word 24 is selected to enable the framer 22 to accurately identify the position word 24 within a recovered sub-stream 20, and a significant hamming distance is used to provide bit error tolerance. In this respect, a "significant" hamming distance refers to a hamming distance that is at least ½ of the maximum theoretically possible hamming distance, based on the length of the respective word.

In the illustrated example, the position word 24 has a length of 22 bits, and a hamming distance of ten relative to a shifted version of itself. Using the framing algorithm described below with respect to FIGS. 2 through 4, a 22-bit position word length yields a high probability of correctly finding the position word 24 within a recovered sub-stream 20. A hamming distance of ten relative to a shifted version of itself, means that ten errored bits must occur within a sequence of 22 bits of a recovered sub-stream 20 in order for the position word 24 to be confused with a shifted version of itself. This implies a high probability of correctly identifying the phase of the position word 24 (and thus achieving frame lock), even within a high error rate sub-stream. As may be appreciated, increasing the hamming distance tends to increase error tolerance, but at a cost of increased demand on system resources, and possibly longer times to correctly acquire frame lock. A position word 24 having a length of 22-bits and a hamming distance of ten relative to a shifted version of itself represents a compromise between error tolerance and frame acquisition time.

It will be noted that a large number of possible unique position words 24 exist having a length of 22-bits and a hamming distance of 10 relative to a shifted version of itself. In the embodiment illustrated in Table 1, two unique position words 24 are used repeatedly, which reduces hardware and/or software requirements within the framer 22 (as will be described below) while being sufficient for an embodiment of the invention in which 16 sub-streams 10 are interleaved into the data signal 12. It will be appreciated however, that more than two unique position words 24 may be used. For example, each sub-stream 10 may be assigned a unique position word 24, if desired.

As mentioned previously, the identifier word 26 is used in combination with the position word 24 to uniquely identify each sub-stream 10 within the data signal 12. Thus it is convenient to define a set of predetermined identifier words 26, each of which can be used in combination with each one of the unique position words 24. In the embodiment illustrated in Table 1, a set of eight unique identifier words 26 is defined. Each of these identifier words 26 is used in combination with each one of the two unique position words 24 to yield 16 unique synchronization words 4 that uniquely identify each one of 16 sub-streams 10. As shown in Table 1, each identifier word 26 has a length of 10 bits and a hamming distance of five relative to each of the other identifier words in the set.

As with the position word 24, the length of the identifier word 26 is selected to ensure accurate detection of the identifier word 26 within a recovered sub-stream 20 (following detection of the position word 24), while the hamming distance provides bit error tolerance.

In combination, the 22-bit position word 24 and 10-bit identifier word 26 yield robust framing operation, with steady state bit error rates of 0.01, and an ability to acquire and maintain frame for bit error rates of up to 0.05, with acceptable reliability.

As is known in the art, modern optical networks utilize automatic optimization of elements in a link. During start-up and optimization of the link, control parameters are typically perturbed to find the optimum operating point. Until steady state operation is achieved during start-up, the link may have BERs far exceeding those acceptable for normal operation. Loss of frame during this period prevents the system from optimizing operation, or may prevent recovery from some unusual perturbation. While the data at BER=0.01 is useless, if frame lock is maintained, the system can perform its optimization sequence, resulting in a much lower operating BER. Using the synchronizing word 4 described above, the framer of the present invention will maintain frame lock, with reasonable probability, during excursions to BER=0.05.

As shown in FIG. 1, the framer 22 has a hierarchical architecture comprising a respective individual framer 28 for framing each of the recovered sub-streams 20, and a master framer 30 for controlling operations of each individual framer 28 and for establishing a frame lock condition with respect to the data signal 12 as a whole.

Figure 2:
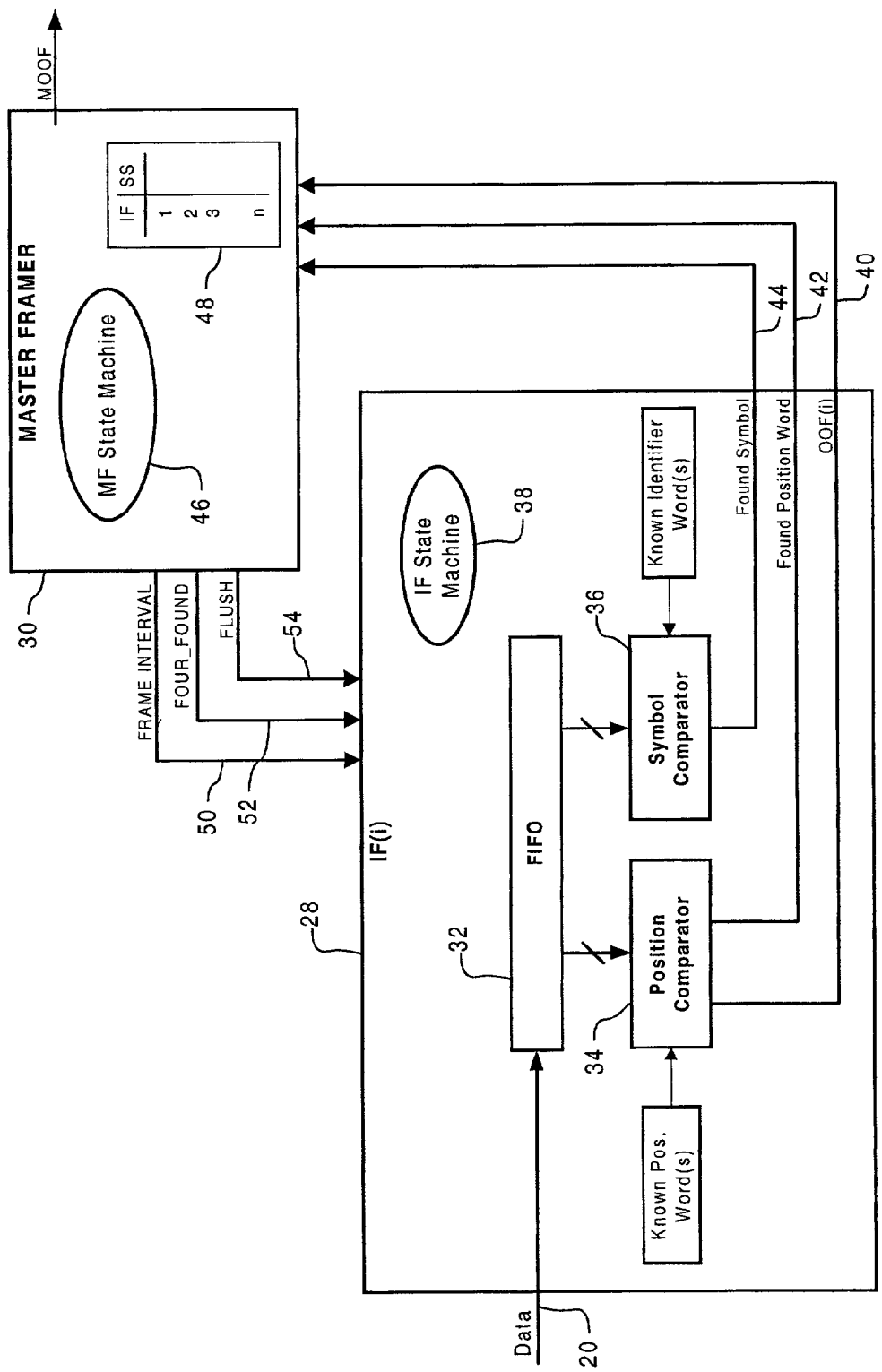
FIG. 2 is a block diagram schematically illustrating elements of a master framer and an individual framer of the framer of FIG. 1.
Figure 3A:
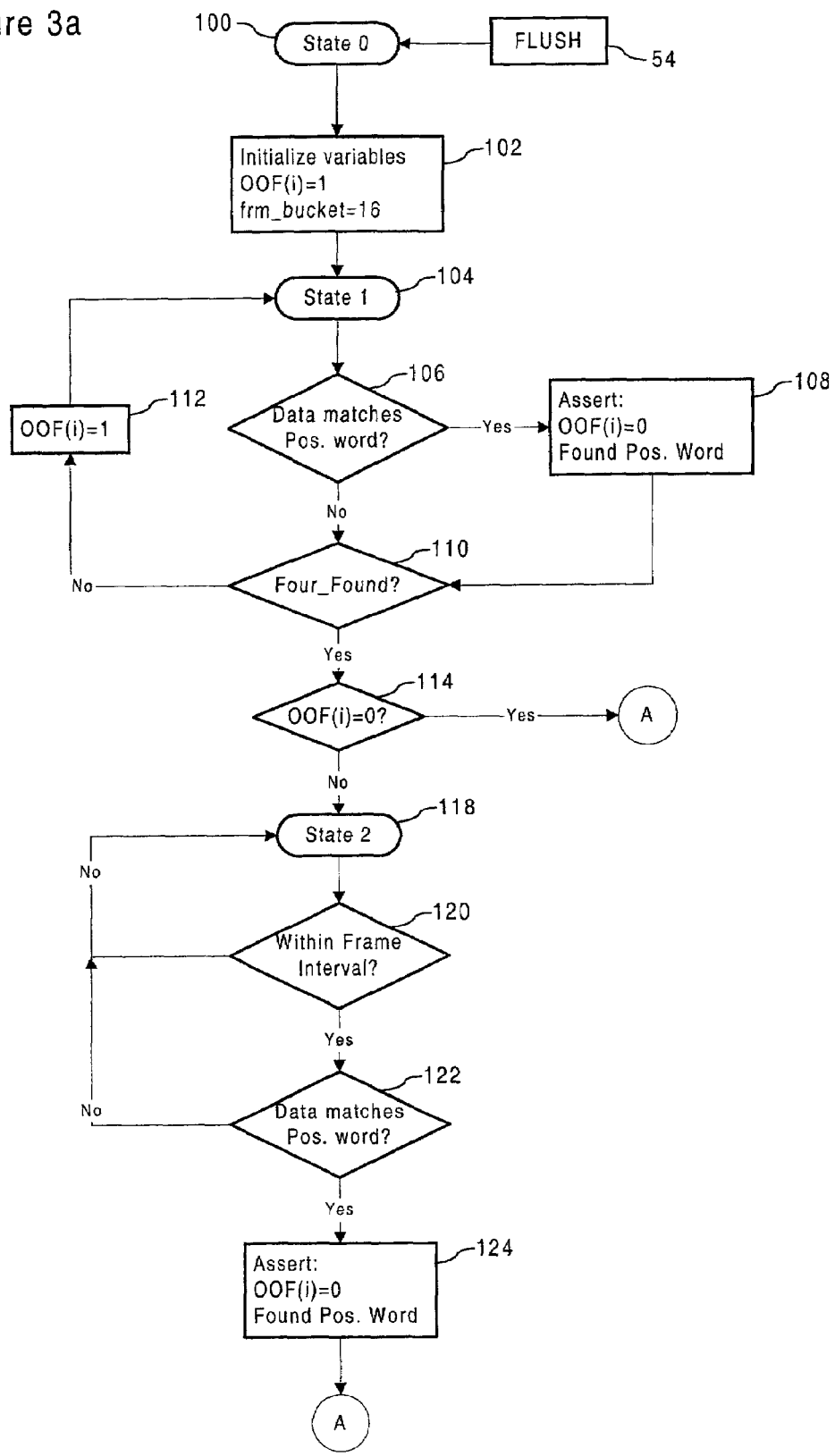
Figure 4:
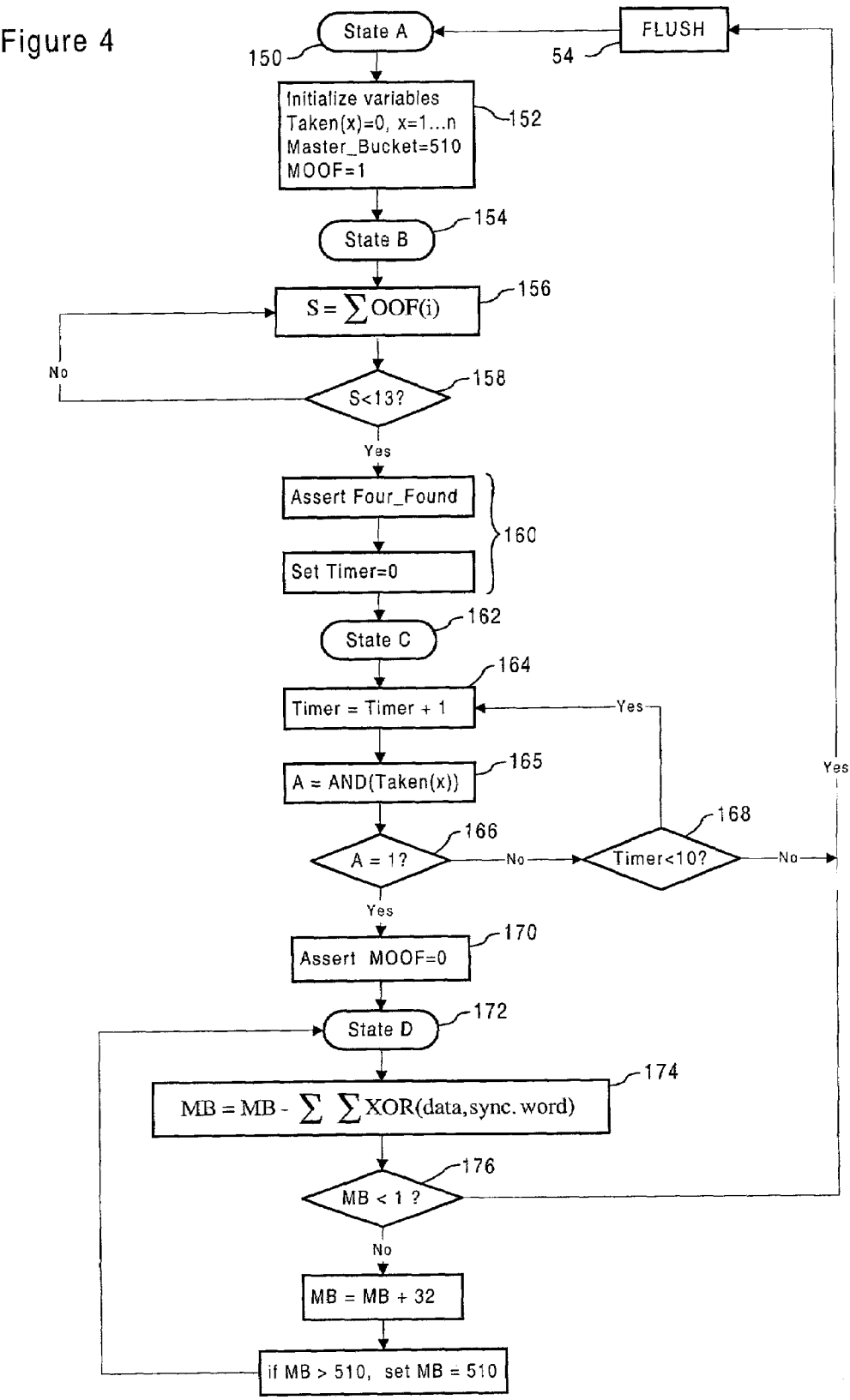
FIG. 4 is a state diagram schematically illustrating state transitions of the MF state machine of the master framer of FIG. 1.

FIG. 2 is a block diagram schematically illustrating principle elements of each individual framer 28 and the master framer 30, as well as principle messages exchanged between each individual framer 28 and the master framer 30 during frame acquisition in accordance with an embodiment of the present invention. Exemplary operations of the individual framer 28 and the master framer 30 are illustrated in FIGS. 3a and 4 respectively.

As shown in FIG. 2, each individual framer 28 generally comprises a buffer 32 such as a first-in-first-out (FIFO) for receiving and buffering a respective recovered sub-stream 20 output by the demultiplexer 18 (see FIG. 1); a position comparator 34 for comparing the buffered sub-stream data to each of the known position words 24; a symbol comparator 36 for comparing the buffered sub-stream data to each of the known identifier words 26; and an individual framer state machine 38 for controlling operations of the individual framer 28. Each of the elements of an individual framer 28 may be implemented by any suitable combination of hardware and/or software, in accordance with the requirements of each specific implementation. As shown in FIG. 2, exemplary outputs generated by each individual framer 28 include an Out-Of-Frame flag (OOF(i)) 40; a Found_Position_Word 42; and a Found_Symbol 44, each of which are forwarded to the master framer 30. The OOF(i) 40 may conveniently be provided as a binary signal generated by the position comparator 34, based on the results of comparison of the buffered sub-stream data with the known position words 24. For example, the position comparator 34 may assert OOF(i) 40 (that is, output a binary "1") when the buffered sub-stream data does not match any known position word 24, and therefore the individual framer 28 is in an "out of frame" condition. When the position comparator 34 determines that the buffered sub-stream data does match one of the known position words 24, the position comparator 34 can de-assert OOF(i) 40 (that is, output a binary "0") indicating that the individual framer 28 has located a frame within the recovered sub-stream 20. Simultaneously, the position comparator 34 may also output the Found_Position_Word 42 to indicate which one of the known position words 24 has been found within the buffered sub-stream data. The Found_Position_Word 42 may take any convenient value such as, for example, the position word itself, or a predetermined tag value which can be used by the master framer 30 to identify the position word found by the individual framer 28. Similarly, the symbol comparator 36 may output the Found-Symbol 44 based on the results of comparison between the buffered sub-stream data and the known identifier words 26. When one of the known identifier words 26 is located within the buffered sub-stream data, the identity of the identifier word is forwarded to the master framer as the Found-Symbol 42. This may take the form of the identifier word 26 located by the symbol comparator within the buffered sub-stream data, or a predetermined tag value that may be used by the master framer 30 to identify the specific one of the known identifier words found by the individual framer 28.

As shown in FIG. 2, the master framer 30 generally comprises a master framer state machine 46; and a registry 48 for enabling the master framer 30 to associate each of the individual framers 28 with a respective one of the processed sub-streams 10 originally multiplexed into the data signal 12 at the transmitting node 8. As shown in FIG. 2, the master framer 30 receives the OOF(i) 40, Found_Position_Word 42, and Found-Symbol 44 generated by each of the individual framers 28. In addition the master framer 30 generates a search window signal 50 and a Four_Found signal 52, both of which are propagated simultaneously to all of the individual framers 28. The master framer 30 also generates a respective Flush signal 54 for each individual framer 28, so that the master framer 30 can cause a flush (i.e. a reset) of a selected one of the individual framers 28.

Principle operations of each of the individual framers 28 and the master framer 30 are described below in greater detail with reference to FIGS. 3a, 3b and 4.

FIGS. 3a and 3b show a state diagram schematically illustrating state transitions of the individual framer state machine 38 within each individual framer 28. As shown in FIG. 3a, upon start-up or reset of the framer 22, or upon reception of a Flush signal 54 from the master framer 30, the IF state machine 38 enters a State-0 100 in which the OOF(i) 40 is asserted (e.g. set to "1") to indicate an out-of-frame condition, and other internal variables and registers of the IF state machine 38 (e.g. a Frame-bucket) are initialized in a conventional manner 102. The IF state machine 38 then enters a State-1 104 in which the position comparator 34 operates to compare buffered sub-stream data with each of the known position words 24 (at 106). If a match is found, the OOF(i) 40 is de-asserted (to indicate that a position word 24 has been found within the respective sub-stream) for a predetermined period of time (at 108). The duration of this predetermined period of time is preferably selected based on an expected time interval between a bit of a first interleaved sub-stream 10a and a corresponding bit of a last interleaved sub-stream 10n within the high-speed data signal 12. This means that, in the event that each individual framer 28 correctly identifies a respective position word 24 within its respective recovered sub-stream 20, then corresponding OOF(i) signals 40 will be de-asserted by each of the involved individual framers 28 simultaneously, for at least a portion of the predetermined period. In the embodiment illustrated in FIGS. 1 through 4, the high-speed data signal 12 corresponds to an OC-768 signal composed of sixteen interleaved OC-48 sub-streams. In this situation, corresponding bits of a first interleaved sub-stream 10a and a last interleaved sub-stream 10n will be separated within the high-speed data signal 12 by up to 250 nano-seconds (nSec) (for the case of parallel optical transmission of the sixteen OC-48 sub-streams 10). Thus, for the illustrated embodiment, the duration of the predetermined period of time, during which OOF(i) 40 is de-asserted by the individual framer 28, can be set to 250 nSec. Simultaneously with de-assertion of the OOF(i) 40 (at 108), the individual framer 28 also asserts the Found_Position_Word signal 42, as described above with reference to FIG. 2.

As may be expected, the probability of finding any given position word 24 within a frame of a recovered sub-stream 20 depends, at least in part, on the size of each frame. In the illustrated embodiment, each frame of a recovered sub-stream is of STS-48 size, and the resulting probability of finding a given 22-bit position word 24 at one or more locations within that frame is too high to enable reliable framing of the sub-stream 20. However, the probability of simultaneously finding respective different 22-bit position words 24 within two or more of the recovered sub-streams 20 decreases rapidly as the number of involved sub-streams 20 increases. Thus, as will be described in greater detail below with reference to FIG. 4, the master framer 30 monitors the OOF(i) 40 asserted by each of the individual framers 28. If, at any instant, at least four of the individual framers 28 simultaneously de-assert OOF(i) 40, then the master framer 30 determines that at least four of the individual framers 28 have simultaneously located position words within their respective recovered sub-streams, and asserts the Four_Found signal 52. Otherwise, the master framer 30 de-asserts the Four_Found signal 52. As shown in FIG. 3a, each individual framer 28 monitors the Four_Found signal 52 asserted by the master framer 30 (at 110). If the Four_Found signal 52 is not detected (at 110), then OOF(i) 40 is asserted (at 112) and the individual framer 28 continues comparing buffered sub-stream data with the known position words 24 as described above. If the Four_Found signal 52 is detected (at 110), and if (at 114) the OOF(i) 40 has also been de-asserted, the IF state machine 38 proceeds to State-3 116 (FIG. 3b). Otherwise, if (at 114) the OOF(i) 40 has been asserted, then the IF state machine 38 proceeds to State-2 118.

Within State-2 118, the individual framer 28 continues searching for a position word 24 within its respective buffered sub-stream data. However, within this state, the search is restricted to a search window corresponding to a portion of the recovered sub-stream 20 bracketing the location at which position words 24 have been found by other ones of the individual framers 28. As with the predetermined period of time in which the OOF(i) 40 is asserted (at 108), the duration of the search window may be determined on the basis of the anticipated delay between a bit of a first interleaved sub-stream 10a and a corresponding bit of a last interleaved sub-stream 10n within the high-speed data signal 12. Thus for example, in the illustrated embodiment, the search window may be set to encompass that portion of the respective recovered sub-stream 20 commencing 250 nSec prior to assertion of the Four_Found signal 52, and ending 250 nSec after assertion of the Four_Found signal 52. The timing of the search window is determined by the master framer 30 (e.g. based on the timing of the Four_Found signal 52) and communicated to the individual framer 28 by means of the Frame_Interval signal 50 (see FIG. 2). For example, within the search window, the master framer 30 may assert the Frame_Interval signal 50, and de-assert the Search window signal 50 otherwise.

Within State-2 118, the IF state machine 38 uses the Frame_Iinterval signal 50 to control operations of the position comparator 34. Thus, when the Frame_Interval signal 50 is asserted (at 120), the position comparator 34 operates as described above to compare the buffered sub-stream data to each of the known-position words 24 (at 122). If one of the known position words 24 is found within the buffered sub-stream data (at 122), the individual framer 28 (at 124) de-asserts OOF(i) 40 for the predetermined period of time (e.g. 250 nSec), the Found_Position_Word signal 42 is asserted to identify the position word 24 found in the buffered sub-stream data, and the IF state machine 38 proceeds to State-3 116.

As mentioned previously, the symbol comparator 36 operates to compare buffered sub-stream data to each one of the known identifier words 26. In principle this operation may proceed in parallel with operation of the position comparator 34, for example, by examining a portion of the buffered sub-stream data having a predetermined relationship with the buffered sub-stream data being examined by the position comparator 34. Thus, as shown in FIG. 3b, when the IF state machine 38 enters State-3 116, the symbol comparator 36 is checked (at 126) to determine if the buffered sub-stream data matches any of the known identifier words 26. If no match is found, the symbol comparator 36 continues examining the buffered sub-stream data within State-3. Otherwise, if a match is found between the buffered sub-stream data and one of the known identifier words 26, the individual framer 28 asserts a value of the Found-Symbol signal 44 that is representative of the identifier word 26 found within the buffered sub-stream data (at 128). As mentioned previously, the value of the Found-Symbol signal 44 may be the actual identifier word 26 found by the symbol comparator 36, or a predetermined tag value (not shown) representative of the identifier word 26 found by the symbol comparator 36.

As described above with reference to FIG. 2, the master framer 30 includes a registry 48 for associating each one of the individual framers 28 with a respective one of the processed sub-streams 10 originally multiplexed into the high-speed data signal 12. Thus an associated registry process of the master framer 30 uses the Found_Position Word signal 42 and the Found-Symbol signal 44 asserted by the individual framer 28 to identify (at 130) the respective recovered sub-stream 20 being received by the individual framer 28. If the identified sub-stream 20 has already been associated with another one of the individual framers (at 132), as indicated by an appropriate entry in the registry 48, then the master framer 30 asserts a Flush signal 54 (at 134) to reset the individual framer 28 back to State-0 100, and thus re-start the process of acquiring and identifying the respective recovered sub-stream 20. Otherwise, the registry process updates the registry 48 (at 136) to associate the individual framer 28 with the identified sub-stream 20. One or more additional variables may also be set within the master framer 30 (at 138) to reflect association of the individual framer 28 with the identified sub-stream 20. In the illustrated embodiment, for example, the master framer 30 includes a "Taken" array (not shown)) having respective fields corresponding to each one of the recovered sub-streams 20 of the high-speed data signal 12. Thus, as shown in FIG. 3, following association of an individual framer 28 with a respective identified sub-stream 20, the corresponding field of the "Taken" array is also updated for use by the master framer state machine 46 as will be described in greater detail below with reference to FIG. 4.

Upon successful completion of State-3 processing as described above, the individual framer state machine 38 enters State-4 (at 140), in which the respective recovered sub-stream 20 is monitored for loss of frame lock. As shown in FIG. 3, this may be accomplished, in a bit error tolerant manner, by comparing buffered sub-stream data to the synchronization word 22 (i.e. the position word 24+identifier word 26) found during State-1, State-2 and State-3 processing of the individual framer state machine 38, and then calculating a Frame_Bucket value (at 142) indicative of a proximity between the buffered sub-stream data and the identified synchronization word 22. This Frame_Bucket value is then compared (at 144) against a predetermined threshold. Based on the results of this comparison, the IF state machine either remains in State-4 (at 146), or resets to State-0 (at 100) and begins the process of re-acquiring the respective recovered sub-stream 20.

FIG. 4 is a state diagram schematically illustrating state transitions of the MF state machine 46 of the master framer 30. In general, the MF state machine 46 runs in parallel with the IF state machines 38 of the individual framers 28, and the MF state machine 46 traverses each of its own states as the IF state machines 38 traverse States-0 through 4 as described above. Thus upon start-up or reset of the master framer 30, the MF state machine 46 enters State A (at 150), and initializes the registry 48 and other internal variables, as well as each of the signals 50–54 asserted by the master framer 30 (at 152). Following initialization, the MF state machine 46 transitions to State B (at 154), and examines the OOF(i) signals 40 being asserted by each of the individual framers 28 in order to determine the number of individual framers 28 that have identified one of the known position words 24 within their respective recovered sub-stream 20. In the illustrated embodiment, this is accomplished by summing the OOF(i) signals 40 (at 156), and comparing the summation result to a predetermined threshold (at 158). Using this approach, a summation result of less than a threshold value of 13 (in an embodiment in which sixteen sub-streams are interleaved into the high-speed data signal 12) indicates that at least four of the individual framers 28 are simultaneously de-asserting OOF(i) 40, thereby indicating that one of the known position words 24 has been found within their respective recovered sub-stream 20. When this condition is satisfied, the Four_Found signal 52 is asserted by the master framer 30, and a timer (e.g. a frame counter) is initialized to zero (at 160). The MF state machine 46 then transitions to State C (at 162) in order to complete frame acquisition.

Upon entry into State C (at 162), the MF state machine 46 increments the timer (at 164), and determines whether or not all of the individual framers 28 have been associated with one of the sub-streams in the registry 48 (discussed above with reference to FIGS. 2 and 3a–3b). In the illustrated embodiment, this is accomplished by ANDing the "Taken" array (at 165), and examining the result of the ANDing operation (at 166). If the AND operation result is "0", then it is determined that at least one of the individual framers 28 has not been associated with a sub-stream 20 in the registry 48. Accordingly, the timer is compared with a predetermined threshold (at 168). If the timer is less than the predetermined threshold, the MF state machine 46 increments the timer (at 164) before re-evaluating whether or not all of the individual framers 28 have been associated with a respective sub-stream 20 (at 165 and 166). On the other hand, if the timer is equal to the predetermined threshold (in this case 10), the MF state machine 46 returns to State A (at 150), and resets the entire framer 22 to re-start the frame acquisition process. The purpose of the predetermined threshold, in this case, is to prevent a condition in which the master framer state machine 46 reaches State C on the basis of erroneous detection of position and identifier words 24,26 within four or more individual framers 28, but cannot complete State-C (and thereby achieve frame lock) because the remaining individual framers 28 are unable to locate position and identifier words 24,26 within the asserted search window. Thus, in the present embodiment, if all of the individual framers 28 are unable to identify respective position and identifier words 24,26 within their respective recovered sub-streams 20, within a predetermined number of frames (in this case, ten) after entering State-C (at 162) then the entire framer 22 is reset.

If it is determined (at 166) that all of the individual framers 28 have been associated with a respective one of the sub-streams 20 in the registry 48, then the MF state machine 46 declares a frame lock condition by de-asserting Master Out Of Frame (MOOF) (that is, setting the MOOF value to binary "0") (at 170), and then transitions to State-D (at 172).

Processing of the MF state machine 46 within State-D (at 172) is analogous to the processing of each IF state machine 38 within State-4 (discussed above with reference to FIG. 3). Thus, the MF state machine 46 calculates (at 174) a Master_Bucket (MB) value indicative of the proximity of each of the synchronization words 22 with the buffered substream data within each of the individual framers 28. The MB value is then compared (at 176) with a predetermined threshold which is selected to enable robust retention of the frame lock condition in a bit error tolerant manner, while at the same time enabling a reset of the framer 22 in an event that frame lock is lost. In the present case, if the calculated MB value is less than 1, then it is determined (at 176) that frame lock has been lost, and the MF state machine 46 resets the framer 22 and returns to State A (at 150). Otherwise, the MF state machine 46 continues monitoring the frame lock status of the framer 22 within State-D.

The embodiment(s) of the invention described above is(are) intended to be exemplary only. The scope of the invention is therefore intended to be limited solely by the scope of the appended claims.

We claim:

1. A method of framing a data signal received through a link of a communications network, the data signal comprising M (an integer, M>1) interleaved sub-streams, the method comprising steps of:
   inverse multiplexing the data signal to generate M recovered sub-streams; and
   detecting a respective unique synchronizing word in each of the recovered sub-streams, within a predetermined search window corresponding to a portion of the data signal received during a predetermined time interval;
   wherein a bit pattern of each synchronization word is selected such that an energy spectrum of the plurality of respective synchronization words interleaved within the data signal is substantially white.

2. A method as claimed in claim 1, wherein the width of the predetermined search window is determined using an expected delay between corresponding data units of a first interleaved sub-stream and a last interleaved sub-stream of the data signal.

3. A method as claimed in claim 2, wherein the search window corresponds to a portion of the data signal received during a period of up to twice an expected delay between corresponding data units of a first interleaved sub-stream and a last interleaved sub-stream of the data signal.

4. A method as claimed in claim 1, wherein the step of detecting a unique synchronizing word comprises steps of:
   searching each recovered sub-stream to detect a respective synchronizing word;
   when a synchronizing word is detected in a sub-stream, asserting a respective individual frame found state for a first predetermined period of time; and
   asserting a master frame found state if the individual frame found state is asserted in respect of all of the sub-streams within the predetermined search window.

5. A method as claimed in claim 4, wherein the first predetermined period of time is determined using an expected delay between corresponding data units of a first interleaved sub-stream and a last interleaved sub-stream of the data signal.

6. A method as claimed in claim 4, wherein the step of searching the data signal comprises, for each recovered sub-stream, steps of:
   buffering a portion of the recovered sub-stream; and
   comparing the buffered sub-stream data against each one of a set of predetermined unique synchronizing words, to detect a respective one of the set of predetermined unique synchronizing words in the recovered sub-stream.

7. A method as claimed in claim 6, wherein each synchronizing word comprises a non-unique position word and a non-unique identifier word, and the step of comparing the buffered sub-stream data against each one of a set of predetermined unique synchronizing words comprises steps of:
   comparing the buffered sub-stream data against each one of a set of predetermined valid position words to detect a position word in the recovered sub-stream; and
   when a position word is detected in the recovered sub-stream, comparing the buffered sub-stream data against each one of a set of predetermined valid identifier words to detect an identifier word in the recovered sub-stream.

8. A method as claimed in claim 4, wherein the step of asserting a respective individual frame found state comprises steps of:
   de-asserting an individual Out-of-Frame flag associated with the respective recovered sub-stream; and
   asserting information indicative of the synchronizing word detected in the respective recovered sub-stream.

9. A method as claimed in claim 8, further comprising steps of:
   identifying a respective one of the interleaved sub-streams using the asserted information indicative of the synchronizing word detected in the recovered sub-stream; and
   associating the identified interleaved sub-stream with the recovered sub-stream.

10. A method as claimed in claim 9, further comprising a step of reinitializing the search of the recovered sub-stream if the identified interleaved sub-stream has previously been associated with another one of the recovered sub-streams.

11. A method as claimed in claim 4, wherein the step of asserting a master frame found state comprises steps of:
   monitoring a number of recovered sub-streams for which respective individual frame found states are simultaneously asserted;
   detecting a location in the data signal at which individual frame found states are simultaneously asserted in respect of at least N (an integer 1<N<M) of the M recovered sub-streams;
   asserting the search window bracketing the detected location at which individual frame found states are simultaneously asserted in respect of at least N of the recovered sub-streams; and
   asserting a master frame found state if individual frame found states are asserted in respect of all of the recovered sub-streams within the asserted search window.

12. A method as claimed in claim 11, wherein the value of N is determined using an expected probability of an individual frame-found state being incorrectly asserted in respect of any one of the M recovered sub-streams.

13. A method as claimed in claim 12, wherein N is 4.

14. A method as claimed in claim 11, wherein the step of searching each one of the M recovered sub-streams comprises, for a recovered sub-stream in respect of which an individual frame-found state has not been asserted, a step of narrowing the search of the recovered sub-stream to the portion of the recovered sub-stream within the asserted search window.

15. A method as claimed in claim 11, further comprising a step of restarting framing of the data signal if the master frame found state is not asserted within a second predetermined period of time.

16. A method as claimed in claim 15, wherein the second predetermined period of time comprises a predetermined number of frames following a first assertion of the search window.

17. A method as claimed in claim 16, wherein the predetermined number of frames is determined using an expected probability of the frame-possible state being incorrectly asserted.

18. A method as claimed in claim 16, wherein the predetermined number of frames is ten.

19. A synchronizing word adapted for uniquely identifying a respective one of M (an integer, M>1) sub-streams interleaved within a data signal, the synchronizing word comprising:
  a non-unique position word having a hamming distance, relative to a shifted version of itself, that is at least ½ of a maximum theoretically possible hamming distance, based on a length of the position word; and
  a non-unique identifier word selected from a set of predetermined identifier words, the identifier word having a hamming distance, relative to each of the other identifier words in the set, that is at least ½ of a maximum theoretically possible hamming distance, based on a length of the identifier word.

20. A synchronizing word as claimed in claim 19, wherein a bit pattern of the synchronizing word is selected such that an energy spectrum of respective synchronization words of each of the sub-streams interleaved within the data signal is substantially white.

21. A synchronizing word as claimed in claim 19, wherein respective lengths of the position and identifier words are selected using one or more of:
  a probability of incorrectly detecting the synchronizing word in the data signal; and
  a mean time to correctly declare the master frame found state.

22. A synchronizing word as claimed in claim 21, wherein the position word has a length of at least 16 bits, and at most 32 bits.

23. A synchronizing word as claimed in claim 21, wherein the respective hamming distances of the position and identification words are selected using an expected bit error rate (BER) of the data signal.

24. A synchronizing word as claimed in claim 23, wherein the expected BER is about 0.05, or less.

25. A synchronizing word as claimed in claim 24, wherein the hamming distance of the position word is about 10.

26. A synchronizing word as claimed in claim 24, wherein the length of the identification word is about 10 bits and the hamming distance of the identification word is about 5.

27. A framer adapted for framing a high error rate data signal received through a link of a communications network, the data signal comprising M (an integer, M>1) interleaved sub-streams, the framer comprising means for detecting a respective unique synchronizing word in each one of M recovered sub-streams extracted from the data signal, within a predetermined search window corresponding to a portion of the data signal received during a predetermined time interval, wherein a bit pattern of each synchronization word is selected such that energy spectrum of the plurality of respective synchronization words interleaved within the data signal is substantially white.

28. A framer as claimed in claim 27, wherein the width of the predetermined search window is determined using an expected delay between corresponding data units of a first interleaved sub-stream and a last interleaved sub-stream of the data signal.

29. A framer as claimed in claim 28, wherein the search window corresponds to a portion of the data signal received during a period of up to twice an expected delay between corresponding data units of a first interleaved sub-stream and a last interleaved sub-stream of the data sigal.

30. A framer as claimed in claim 27, wherein the means for detecting a unique synchronizing word comprises:
  a respective individual framer including:
    means for searching each recovered sub-stream to detect a respective synchronizing word; and
    means for asserting a respective individual frame found state for a first predetermined period of time when a synchronizing word is detected; and
  a master framer adapted for asserting a master frame found state if the individual frame found state is asserted in respect of all of the sub-streams within the predetermined search window.

31. A framer as claimed in claim 30, wherein the first predetermined period of time is determined using an expected delay between corresponding data units of a first interleaved sub-stream and a last interleaved sub-stream of the data signal.

32. A framer as claimed in claim 30, wherein the means for searching each recovered sub-stream comprises:
  a buffer adapted for buffering a portion of the recovered sub-stream; and
  means for comparing the buffered sub-stream data against each one of a set of predetermined unique synchronizing words, to detect a respective synchronizing word in the recovered sub-stream.

33. A framer as claimed in claim 32, wherein each synchronizing word comprises a non-unique position word and a non-unique identifier word, and the means for comparing the buffered sub-stream data against each one of a set of predetermined unique synchronizing words comprises steps of:
  a first comparator adapted to compare the buffered sub-stream data against each one of a set of predetermined valid position words to detect a position word in the recovered sub-stream; and
  a second comparator responsive to detection of a position word in the recovered sub-stream, for comparing the buffered sub-stream data against each one of a set of predetermined valid identifier words to detect an identifier word in the recovered sub-steam.

34. A framer as claimed in claim 30, wherein the means for asserting a respective individual Fame found state comprises:
  means for de-asserting an individual Out-of-Frame flag associated with the respective recovered sub-stream; and
  means for asserting information indicative of the synchronizing word detected in the respective recovered sub-stream.

35. A framer as claimed in claim 34, further comprising:
  means for identifying a respective one of the interleaved sub-streams using the asserted information indicative of the synchronizing word detected in the recovered sub-stream; and
  means for associating the identified interleaved sub-stream with the recovered sub-stream.

36. A framer as claimed in claim 35, further comprising means for restarting the individual framer if the identified interleaved sub-steam has previously been associated with another one of the recovered sub-streams.

37. A framer as claimed in claim 30, wherein the master framer comprises:
- means for monitoring a number of recovered sub-streams for which respective individual frame found states are simultaneously asserted;
- means for detecting a location in the data signal at which individual frame found states are simultaneously asserted in respect of at least N (an integer 1<N<M) of the M recovered sub-streams;
- means for asserting the search window bracketing the detected location at which individual frame found states are simultaneously asserted in respect of at least N of the recovered sub-streams; and
- means for asserting a master frame found state if individual frame found states are asserted in respect of all of the recovered sub-streams within the asserted search window.

38. A framer as claimed in claim 37, wherein the value of N is determined using an expected probability of an individual frame-found state being incorrectly asserted in respect of any one of the M recovered sub-stream.

39. A framer as claimed in claim 38, wherein N is 4.

40. A framer as claimed in claim 37, wherein each individual framer comprises means for narrowing the search of the respective recovered sub-stream to the portion of the recovered sub-stream within the asserted search window.

41. A framer as claimed in claim 37, further comprising means for restarting the framer if the master frame found state is not asserted within a second predetermined period of time.

42. A framer as claimed in claim 41, wherein the second predetermined period of time comprises a predetermined number of frames following a first assertion of the search window.

43. A framer as claimed in claim 42, wherein the predetermined number of frames is determined using an expected probability of the frame-possible state being incorrectly asserted.

44. A framer as claimed in claim 42, wherein the predetermined number of frames is ten.

45. A method of transporting a data signal comprising a plurality of interleaved sub-streams through a link of a communications network, each sub-stream being uniquely identified by a respective synchronization word inserted into the respective sub-stream prior to interleaving the sub-streams into the data signal, wherein a bit pattern of each synchronization word is selected such that an energy spectrum of the plurality of respective synchronization words interleaved within the data signal is substantially white.

* * * * *